United States Patent [19]

Powell et al.

[11] 4,372,712
[45] Feb. 8, 1983

[54] CONTINUOUS TRANSFER OF PARTICLES FROM A GASEOUS CONVEYING MEDIUM TO A LIQUID CONVEYING MEDIUM

[75] Inventors: John E. Powell; Andrian J. C. Powell, both of Pittsburgh, Pa.

[73] Assignee: Beloit Corporation, Beloit, Wis.

[21] Appl. No.: 245,110

[22] Filed: Mar. 18, 1981

[51] Int. Cl.³ .................. B65C 53/14; F16K 19/00
[52] U.S. Cl. ............................ 406/153; 406/197; 406/92; 406/194; 417/54; 417/171
[58] Field of Search ............ 406/194, 153, 197, 198, 406/92, 93, 61; 417/171, 197, 54

[56] References Cited

U.S. PATENT DOCUMENTS 3,826,083 7/1974 Brandon et al. ............... 417/171
4,186,772 2/1980 Handleman ............... 417/171 X R

FOREIGN PATENT DOCUMENTS 1235302 5/1960 France ............... 417/197

Primary Examiner—John J. Love
Assistant Examiner—L. E. Williams
Attorney, Agent, or Firm—Buell, Blenko, Ziesenheim & Beck

[57] ABSTRACT

A method and apparatus for the continuous transfer of particles from a gaseous conveying medium to a liquid conveying medium wherein a liquid is introduced into a cone-shaped inducer so that the liquid flows along the inducer's periphery toward its vertex. A stream of the gaseous conveying medium and entrained particles is directed into the center of the inducer. The particles impinge the liquid and are carried away by it and the gas is exhausted.

8 Claims, 1 Drawing Figure

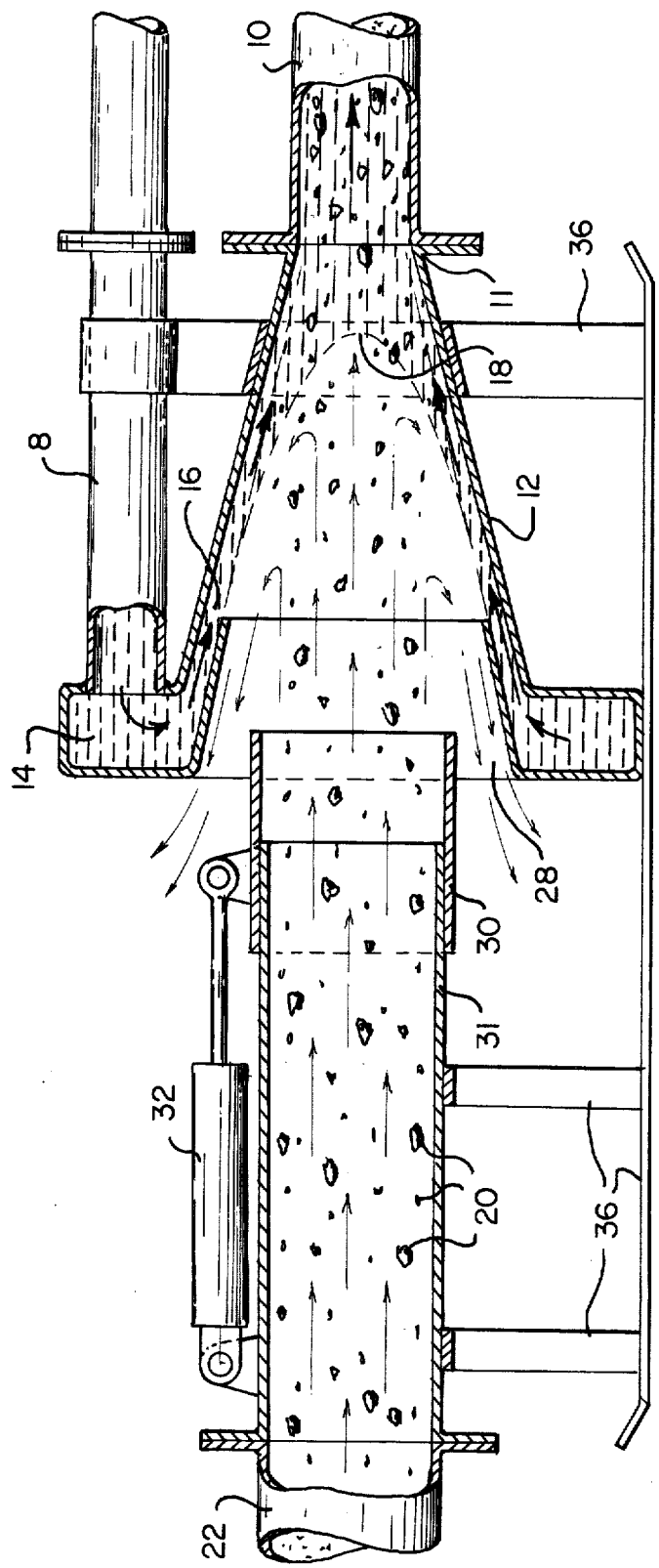

CONTINUOUS TRANSFER OF PARTICLES FROM A GASEOUS CONVEYING MEDIUM TO A LIQUID CONVEYING MEDIUM

BACKGROUND OF THE INVENTION

The transport of materials within a pipeline, either in the form of a slurry as in a liquid transportation system, or moved by pressurized air as in a gaseous conveying system, is a particularly useful and safe method of moving coal and other minerals in underground mines. Each of these methods of solids transfer has certain advantages so that the preferred method depends on the particular situation. Over a long, horizontal distance liquid transportation is favored. However, for a short distance where mobility of equipment is required, as for example following the pattern of a mining machine as it advances in a coal seam, a gaseous conveying system is preferred. Since each method of material transfer has its advantages, both are often used together. It is therefore necessary to accomplish transfer of the transport of materials from a gaseous conveying system to a liquid transport system.

To be effective, the transfer link between the gaseous and liquid conveying systems should simply and efficiently pass the materials between the two mediums in a singular piece of machinery. Currently, this transfer cannot be accomplished in one apparatus. Also, present transfer means are grossly inefficient. The most common transfer method is to catch particles from the air stream and then drop them into the flowing liquid. A major waste in this method and other contemporary devices is that most of the kinetic energy of the particles conveyed in the gaseous conveying medium is lost during the transfer to a liquid medium. We have developed a process and apparatus that overcomes these disadvantages. This invention simply and efficiently transfers conveyed materials from a gaseous conveying system to a liquid transport system within the confines of a singular piece of equipment. Also, the energy loss of the conveyed particles is minimized in the present system.

SUMMARY OF THE INVENTION

In this invention we provide a method of continuously transferring particles from a gaseous conveying medium to a liquid conveying medium which involves injecting a liquid into a cone-shaped inducer in a manner such that the liquid flows adjacent to the inducer's periphery and toward its vertex. A stream of the gaseous conveying medium and entrained particles is directed into the inducer and toward the inducer's vertex thereby causing the particles to be injected into the liquid. The gaseous conveying medium is exhausted from the inducer and the liquid and entrained particles are removed from the inducer.

We prefer that the pressure in the stream of the gaseous conveying medium exceed ten pounds per square inch (10 psi) and the pressure under which the liquid is injected into the inducer exceed fifty pounds per square inch (50 psi). We further prefer that the liquid be injected into the inducer in a manner such that it moves in a swirling motion adjacent to the inducer's periphery and toward its vertex. In addition, we provide a means for varying the pressure of exhaust gas leaving the inducer.

According to the present invention there is also provided an apparatus for the continuous transfer of particles from a gaseous conveying medium to a liquid conveying medium. We provide for four main components of the apparatus:

(i) a liquid conveying pipeline;
(ii) a cone-shaped inducer fixed at its vertex to one end of the liquid conveying pipeline;
(iii) a means of injecting the liquid into the inducer in a manner such that the liquid flows adjacent to the inducer's periphery and toward its vertex; and
(iv) a gaseous conveying pipeline for carrying particles entrained in the gaseous conveying medium.

The gaseous conveying pipeline should be positioned so as to direct a stream of the gas and particles into the center of the inducer and toward the inducer's vertex thereby injecting the conveyed particles into the liquid conveying medium. The position of the gaseous conveying pipeline should also permit exhaust of the gaseous conveying medium through the radial area between the gaseous conveying pipeline and the inducer.

We prefer to provide a means for injecting the liquid into the inducer in a manner such that the liquid moves in a swirling motion adjacent to the inducer's periphery and toward its vertex.

We also prefer to provide a gaseous conveying pipeline containing at least two cylindrical members telescopically positioned so as to enable the overall length of the pipeline to be varied. Further, we prefer to provide for a plurality of hydraulic cylinders attached to the cylindrical members to move the cylindrical members relative to one another.

Other details, objects and advantages of the invention will become apparent as the following description of a present preferred embodiment thereof and a present preferred method of practicing the same proceeds.

In the accompanying drawing we have shown a present preferred embodiment of the invention and have illustrated cross-sectional side view of a present preferred embodiment of the invention.

DETAILED DESCRIPTION

Reference is now made to the accompanying drawing for a better understanding of the invention, wherein all parts are numbered.

In the accompanying drawing, a conical inducer 12 is attached at its vertex 11 to a liquid conveying pipeline 10. A liquid conveying medium 14 is introduced from an inlet pipe 8 into an inducer 12 through a liquid injector 16. The liquid conveying medium 14 flows adjacent to the inner surface of the inducer 12 and a liquid cone depression 18 is developed near the vertex 11 of the inducer 12.

The gaseous conveying material with entrained particles 20 is introduced into the inducer 12 by passing through the gas conveying pipeline 22 having telescoping cylindrical members 30 and 31. The cylindrical members of the gas conveying pipeline 30 and 31 are positioned so as to direct a stream of the gaseous conveying medium and entrained particles 20 into the liquid cone depression 18 formed in the vertex 11 of the inducer 12.

As material particles 20, carried at high velocity by the gaseous conveying medium, emerge from the cylindrical members of the gaseous conveying pipeline 30 and 31 they impinge into the vortex of the liquid cone depression 18. Upon impinging the liquid cone depression 18 the particles 20 become entrained in the liquid conveying medium 14 and are carried through the vertex of the inducer 11 and into the liquid conveying pipeline 10.

On impinging the liquid cone depression 18 the gaseous conveying medium depresses the liquid cone 18 and assists it in keeping its shape. The direction of travel of the gaseous conveying medium is virtually reversed by its contact with the liquid cone depression 18. The gaseous conveying medium then travels adjacent to but in an opposite direction from the liquid conveying medium 14 that flows along the periphery of the inducer 12. The gaseous conveying medium finally is exhausted through a gaseous conveying medium exhaust area 28.

The discharge of the gaseous conveying pipeline 22 is through the cylindrical members 30 and 31. Cylindrical member 30 is movable relative to cylinder 31 to vary the overall length of the gas conveying pipeline 22. At least one hydraulic cylinder 32 accomplishes the movement of cylindrical member 30. It is desirable to vary the length of the gaseous conveying pipeline 22 in order that the pressure of the exhausted gaseous conveying medium be controlled. This adjustment makes it possible to obtain the optimum shape of the water cone depression 18 to operate the system.

Support member 36 is provided to support the structure of the system.

In operation, the material particles 20 travel at a high velocity while entrained in the gaseous conveying medium. This velocity, preferably between 120 and 180 feet per second, causes the particles 20 to have a high kinetic energy in relation to their mass. One advantage of this invention is that upon impinging the liquid cone depression 18, which is at a much lower velocity (preferably 5 feet per second), the particles 20 give up their kinetic energy to the liquid flow and thus assist that flow. Therefore, a portion of the particle's 20 kinetic energy is utilized rather than going to waste as would normally occur when the particles are allowed to discharge into a typical cyclone or other entrapment device.

It will be apparent to persons skilled in the art that this invention can also be used to induce solids into a hydraulic conveying line even if the advantages of a pneumatic system prior to this are not required. For example, this invention can be used in transferring coal from a bin to a hydraulic transportation pipeline for surface transport. Also, the instant arrangement can replace screw conveyers or other contrivances for placing coal or other material into a mechanically powered centrifugal inducer.

While the invention has been described with reference to particular embodiments thereof, it is to be understood that modifications may be made by persons skilled in the art without departing from the spirit of the invention or the scope of the invention defined in the appended claims.

We claim:

1. A method of continuously transferring particles from a gaseous conveying medium to a liquid conveying medium which comprises:
   injecting a liquid into a cone-shaped inducer in a manner such that the liquid flows adjacent to the inducer's periphery toward its vertex;
   directing a stream of the gaseous conveying medium and entrained particles through an inlet pipe into the center of the cone-shaped inducer and directed toward the inducer's vertex, thereby causing the conveyed particles to be injected into the liquid;
   positioning inlet pipe so that the gaseous conveying medium can be exhausted from the inducer opposite its vertex;
   exhausting the gaseous conveying medium from the inducer; and
   removing the liquid conveying medium and entrained particles from the inducer.

2. The method of claim 1 wherein the pressure of the stream of the gaseous conveying medium exceeds 10 pounds per square inch.

3. The method of claim 1 wherein the pressure under which the liquid is injected into the inducer exceeds 50 pounds per square inch.

4. The method of claim 1 wherein the liquid is injected into the inducer in a manner such that the liquid moves in a swirling motion adjacent to the inducer's periphery and toward its vertex.

5. The method of claim 1 wherein exhaust gas volume from the inducer is varied.

6. An apparatus for the continous transfer of particles from a gaseous conveying medium to a liquid conveying medium, which comprises:
   a hydraulic conveying pipeline;
   a cone-shaped inducer fixed at its vertex to one end of the hydraulic conveying pipeline;
   a means of injecting the liquid into the cone-shaped inducer in a manner such that the liquid flows adjacent to the inducer's periphery toward its vertex;
   a gaseous conveying pipeline for carrying particles entrained in the gaseous conveying medium positioned so as to direct a stream of the gaseous conveying medium and entrained particles into the center of the inducer and toward the inducer's vertex and to permit exhaust of the gaseous conveying medium through a radial area between the gaseous conveying pipeline and the inducer.

7. The apparatus of claim 6 wherein the gaseous conveying pipeline contains at least two cylindrical members telescopically positioned so as to enable the length of the pipeline to be varied.

8. The apparatus of claim 7 also comprising a plurality of hydraulic cylinders attached to the cylindrical members to move the cylindrical members relative to one another.

* * * * *